(12) United States Patent
Dolan et al.

(10) Patent No.: US 6,990,344 B1
(45) Date of Patent: Jan. 24, 2006

(54) METHOD AND ARRANGEMENT IN A RADIO COMMUNICATION SYSTEM

(75) Inventors: Tommy Dolan, Co Dublin (IE); Claire Lawlor, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 483 days.

(21) Appl. No.: 09/651,126

(22) Filed: Aug. 30, 2000

(30) Foreign Application Priority Data

Aug. 31, 1999 (SE) ................................. 9903065

(51) Int. Cl.
*H04Q 7/20* (2006.01)
(52) U.S. Cl. .................. 455/437; 455/436; 455/67.11
(58) Field of Classification Search ............... 455/437, 455/436, 67.11, 434, 450, 509, 515
See application file for complete search history.

(56) References Cited

U.S. PATENT DOCUMENTS

| | | | |
|---|---|---|---|
| 5,640,677 A | 6/1997 | Karlsson | 455/33.2 |
| 5,794,149 A | 8/1998 | Hoo | 455/438 |
| 6,295,450 B1 * | 9/2001 | Lyer et al. | 455/436 |
| 6,400,951 B1 * | 6/2002 | Vaara | 455/436 |

FOREIGN PATENT DOCUMENTS

| | | |
|---|---|---|
| WO | WO96/16524 | 5/1996 |
| WO | WO98/36588 | 8/1998 |
| WO | WO99/67902 | 12/1999 |

OTHER PUBLICATIONS

1. PCT International-Type Search Report dated May 24, 2000.
Mouly & Pautet, "*The GSM System for Mobile Communications*", International Standard Boo, No. 2-9507190-0-7, pp. 330-343.

* cited by examiner

*Primary Examiner*—Marceau Milord
*Assistant Examiner*—Eugene Yun
(74) *Attorney, Agent, or Firm*—Roger Borleigh

(57) ABSTRACT

A method and an arrangement in a cellular radio communication network for preparing a measurement order list for transmission to a mobile station operating in a first cell. It is determined (502) whether at least one cell among the neighbouring cells is incapable of acting as a target for handoff of the mobile station. If at least one cell incapable of acting as a target for handoff is found, at least one control channel associated with such a cell is omitted when generating (503) said list by including control channels associated with neighbouring cells.

8 Claims, 3 Drawing Sheets

METHOD AND ARRANGEMENT IN A RADIO COMMUNICATION SYSTEM

TECHNICAL FIELD OF THE INVENTION

The invention relates to a method and arrangement in a cellular radio communication network. More specifically, the invention relates to a method for preparing a measurement order list for transmission to a mobile station. The invention includes a control node and a cellular radio communication network with the necessary means to implement the method.

DESCRIPTION OF RELATED ART

In cellular radio communication systems, such as systems adhering to the TIA/EIA IS-136 air interface specifications, a feature called mobile assisted handoff (MAHO) is used by a cellular network to order a mobile station, in active communication with the cellular network in a cell, to perform measurements on control/measurement channels in neighbouring cells to detect whether those cells are candidates for handoff. The measurements are reported back to the cellular network.

The MAHO measurements are performed by the mobile station listening to each radio channel specified in a measurement order list provided by the cellular network to the mobile station. The quality, and thereby the reliability, of the measurements obtained is dependent on the amount of time the mobile station has to listen to each radio channel. Therefore, measurements of higher quality is obtained when the measurement order list is short and hence the mobile station is able to spend more time measuring each individual channel. A drawback of having a short measurement order list is that the list may not include all potential cells to which the mobile station may be handed off and thus the performance of the system may be reduced due to not considering performing handoff to the optimum cell.

An additional use of MAHO measurements is to obtain downlink measurements for channels that are not control channels of cells included in the neighbouring cell list and hence are not really measured for the purpose of finding candidate cells for handoff. Such measurements may be performed for test purposes, e.g. to detect co-channel interference for frequency planning purposes. As stated above, the quality of the MAHO measurements is reduced when a large number of channels must be measured. This limits the number of other channels that can be added to the measurement order to the mobile station.

The greater the number of channels to be measured, the greater is the bandwith requirement for the reporting of the channel quality measurements.

U.S. Pat. No. 5,794,149 teaches a handoff method and apparatus for use in a wireless communication network in which a base station serving a call selects a handoff candidate base station based in part on subscriber-specific information. The subscriber-specific information may comprise a neighbour blocking list containing a list of all neighbouring base stations for which a handoff is prohibited. The serving base station thus selects the neighbouring base station with the best reported signal quality measurements for which handoff is not prohibited for the subscriber involved in the call.

The published international patent application WO 96/34500 describes a system and a method of restricting an ongoing call of a subscriber to a fixed subscription area (FSA) in a cellular telecommunication system. The system and method detect when the subscriber is crossing a cell border between the serving cell and a neighbour cell, determine whether the cell is located in the FSA and drops the call upon determining that the neighbour cell is located outside the FSA.

SUMMARY OF THE INVENTION

The problem dealt with by the present invention is providing an efficient way of performing mobile assisted handoff measurements.

The problem is solved essentially by a method and an arrangement in a cellular radio communication network for preparing a measurement order list for transmission to a mobile station operating in a first cell, wherein control channels of one or several neighbouring cells which are incapable of acting as targets for handoff, are omitted from the measurement order list.

More specifically, the problem is solved in the following manner. It is determined whether at least one cell among the neighbouring cells is incapable of acting as a target for handoff of the mobile station. If at least one cell incapable of acting as a target for handoff is found, at least one control channel associated with such a cell is omitted from the measurement order list when generating the measurement order list by including control channels associated with neighbouring cells.

One object of the invention is to provide an increased quality of radio signal measurement results reported by mobile stations to a cellular radio communication network.

Another object of the invention is to provide an increased capacity for performing non-handoff related radio signal measurements in mobile stations operating in a cellular radio communication network.

Still another object is to reduce the bandwith used for reporting channel quality measurements from mobile stations to a cellular radio communication network.

One advantage afforded by the invention is that the mobile station is relieved from performing signal quality measurements on control channels in neighbouring cells which are not acceptable handoff candidates anyway.

Another advantage is that the invention enables mobile stations to provide radio signal measurement results of better quality to a cellular radio communication network.

Still another advantage is that the invention provides an increased capacity for performing non-handoff related radio signal measurements in mobile stations operating in a cellular radio communication network.

Yet another advantage is that the bandwith used for reporting channel quality measurements from mobile stations to a cellular radio communication network can be reduced.

The invention will now be described in more detail with reference to exemplary embodiments thereof and also with reference to the accompanying drawings.

DETAILED DESCRIPTION OF THE EMBODIMENTS

Figure 1:
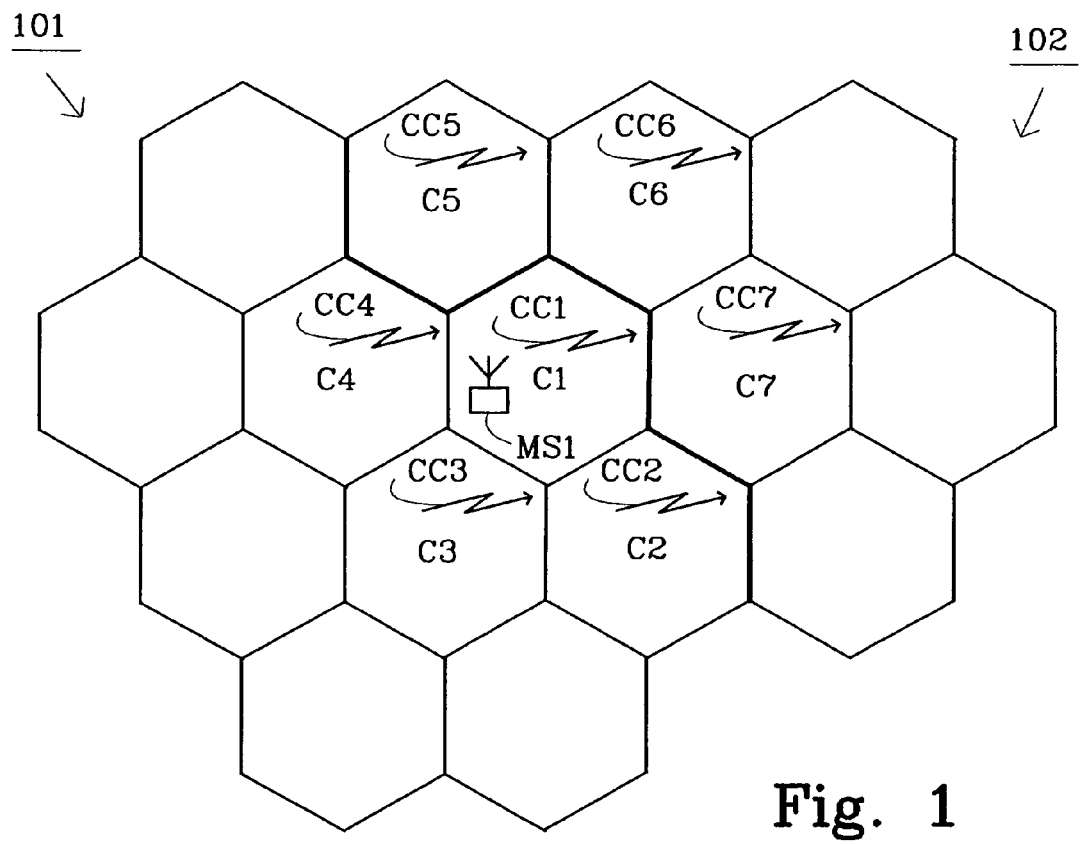
FIG. 1 is a view of cells in two cellular networks.

FIG. 1 illustrates an exemplary scenario of a first cellular radio communication network 101 in a first country and a second cellular communication network 102 in a second country. Both cellular networks are in conformance with the TIA/EIA IS-136 air interface specifications. The geographical area served by the cellular network 101 is divided into a plurality of cells including cells C1–C4, while the geographical area served by the cellular network 102 is divided into a plurality of cells including cells C5–C7. Each cell C1–C7 is allocated a set of radio channels for communication of signalling information and user data between the respective cellular communication network 101–102 and mobile stations operating in the cell. In particular, each cell C1–C7 is allocated a control channel CC1–CC7 used primarily for communication of signalling information including point-to-multipoint broadcast information.

The second cellular network 102 allows a mobile subscriber of the first cellular network 101 having an International Mobile Station Identity (IMSI) to roam into the second network 102. However, due to the use of different numbering plans in the cellular networks 101–102, a mobile subscriber having only a Mobile station Identification Number (MIN), and no IMSI identity, is not allowed to roam into the second cellular network 102. This is due to the fact that it is not possible to guarantee that a MIN-identity allocated to a first mobile subscriber of the first cellular network 101 has not also been allocated to a second mobile subscriber of the second cellular network 102. Hence, it would not be possible to ensure that the first mobile subscriber could be uniquely identified in the second cellular network 102 by its MIN. Thus, assuming the first mobile subscriber has only a MIN-identity and no IMSI-identity, and is operating using a first mobile station MS1 in the first cell C1 of the first cellular network 101, the first mobile station MS1 would not be allowed to roam into cells C5–C7 of the second cellular network 102. However, other subscribers of the first cellular network 101 having IMSI-identities would be allowed to roam into cells C5–C7 of the second cellular network 102.

As previously discussed, the TIA/EIA IS-136 specifications define a Mobile Assisted Handoff (MAHO) procedure which is used by a cellular network to order mobile stations, in active communication with the cellular network in a cell, to perform measurements on control channels in neighbouring cells to detect whether those cells are candidates for handoff. The measurements are reported back to the cellular network. In the exemplary scenario of FIG. 1, cells C2–C7 are the neighbouring cells of cell C1. Thus, a traditional cellular network would order all mobile stations, including the first mobile station MS1, in active communication with the cellular network in the first cell C1, to perform MAHO measurements on the control channels CC2–CC7.

However, since the first mobile station MS1 is not allowed to roam into cells C5–C7, these cells are incapable of serving the first mobile station MS1 and hence it is a waste of resources for the mobile station MS1 to perform and report MAHO measurements on the control channels CC5–CC7 for the purpose of finding a handoff target cell.

The present invention provides an efficient way of performing mobile associated handoff measurements in situations, such as the exemplary scenario described above, where there are neighbouring cells incapable of serving a particular mobile station.

The basic idea of the invention is to omit one or several control channels of those neighbouring cells, that cannot act as targets for handoff, when preparing a measurement order list for transmission to a mobile station.

Figure 2:
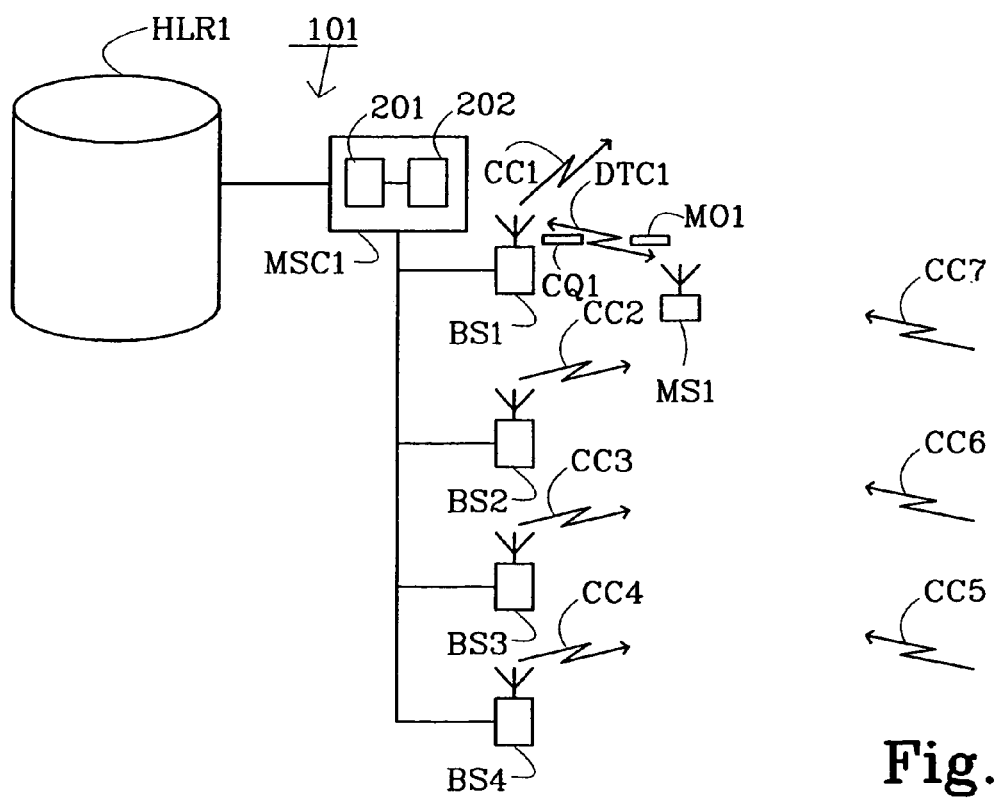
FIG. 2 is a schematic block diagram illustrating a first embodiment of a cellular network and a control node according to the invention.

FIG. 2 shows a simplified schematic view of equipment in the first cellular network 101 introduced in FIG. 1 according to a first embodiment of the invention. The cellular network 101 illustrated in FIG. 2 is in the form of a cellular network having a network structure conforming to the TIA/EIA IS-41 specifications. Note that the invention is in no way limited to be applied only in IS-41 conformant cellular networks, but may on the contrary be applied in many different kinds of cellular radio communication networks. The cellular network 101 comprises a home location register (HLR) HLR1. The cellular network 101 further comprises a first mobile switching centre (MSC) MSC1.

The first mobile switching centre MSC1 depicted in FIG. 2 is assumed to include visitor location registration (VLR) functionality, i.e. the control node MSC1 comprises both the Mobile Switching Center and the Visitor Location Register functional entities defined in IS-41. Base stations BS1–BS4 are connected to the first mobile switching center MSC1 and provide radio coverage in the cells C1–C4 included in the service area of the first mobile switching center MSC1. Since the network elements described above are all well known to a person skilled in the art, the general function of each of these network elements will not be elaborated upon any further.

The first mobile switching center MSC1 is a control node according to a first embodiment of the invention. The first mobile switching center MSC1 comprises a memory 201 and a control unit 202. The control unit 202 is implemented as one or several control processors executing software instructions stored in the memory 201. Apart from software instructions, the memory 201 also holds different kinds of data used when executing the software instructions. In particular, the memory 201 contains configuration data relating to the first cell C1 and its neighbouring cells C2–C7.

Figure 3:
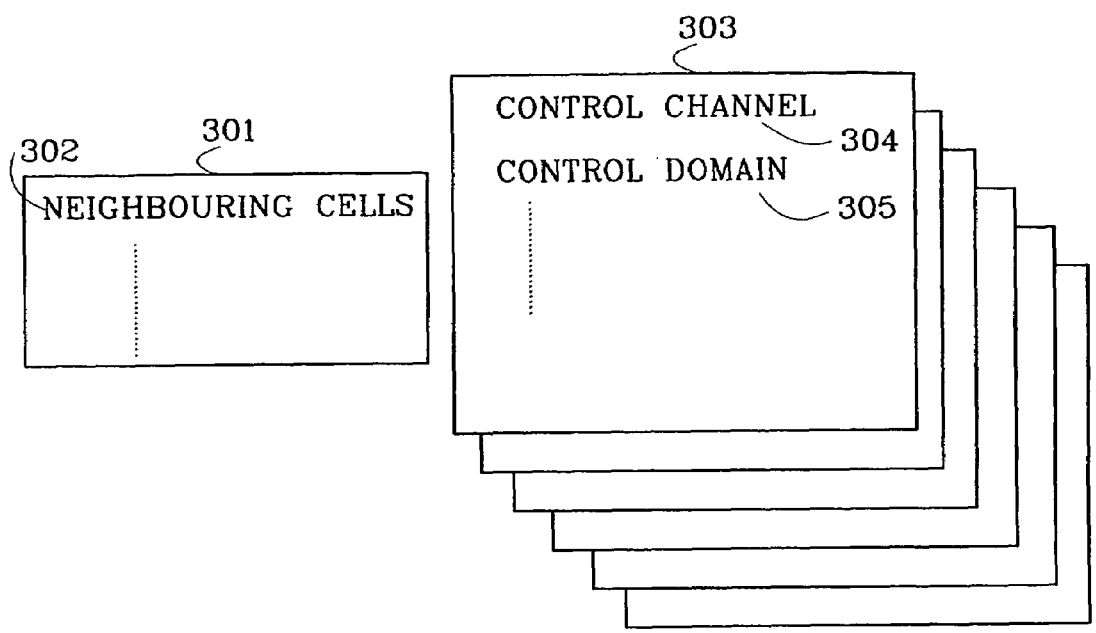
FIG. 3 is a block diagram illustrating configuration data.

FIG. 3 illustrates one possible data structure for said configuration data. There is one cell record 301 associated with cell C1. The cell record 301 includes a neighbouring cell list field 302 containing references to neighbouring cell records 303 defining a set of neighbouring cells, i.e. cells C2–C7, to the first cell C1. Each neighbouring cell record 303 represents one of the neighbouring cells and includes:
- a control channel field 304, defining the control channel associated with the neighbouring cell. For example, the control channel field 304 of the neighbouring cell record 303 representing cell C5 defines control channel CC5 as being associated with cell C5;
- a control domain field 305, defining whether the neighbouring cell is under the control of the first mobile switching center MSC1, another mobile switching center in the first cellular network 101 or a mobile switching center in the second cellular network 102. For example, the control domain field 305 of the neighbouring cell record 303 representing cell C5 indicates that the cell C5 is under the control of a mobile switching center in the second cellular network 102.

As is well known to a person skilled in the art, the home location register HLR1 holds sets of subscriber data, i.e. subscriber profiles, of subscribers of the first cellular network 101. When a mobile station, e.g. the first mobile station MS1, enters a cell belonging to the service area of the first mobile switching center MSC1, it initiates a registration procedure in an idle state to notify the cellular network 101 that the first mobile station MS1 is now present in the service area of the first mobile switching center MSC1. In connection with the registration procedure, a copy of the subscriber profile associated with the first mobile station MS1, is downloaded to the first mobile switching center MSC1 and stored in the memory 201.

Figure 4:
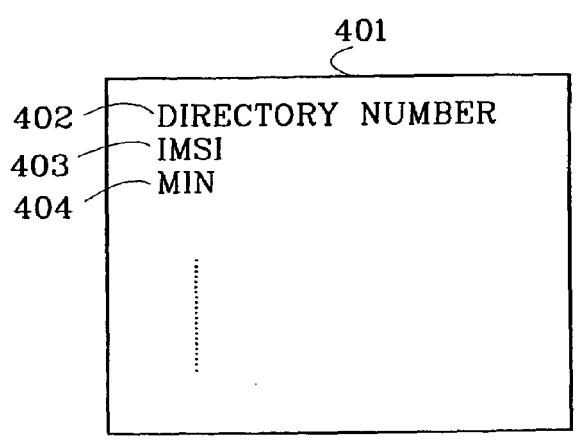
FIG. 4 is a block diagram illustrating a subscriber profile.

FIG. 4 illustrates one example of a possible format of a subscriber profile record 401 for storing the subscriber profile associated with the first mobile station MS1. The subscriber profile record 401 includes a directory number field 402, an IMSI-field 403 and a MIN-field 404. Since the first mobile subscriber has not been allocated an IMSI-identity, the IMSI field 403 of the subscriber profile record associated with the first mobile station MS1 contains a null value indicating that no IMSI-value has been allocated to the first mobile subscriber.

Figure 5:
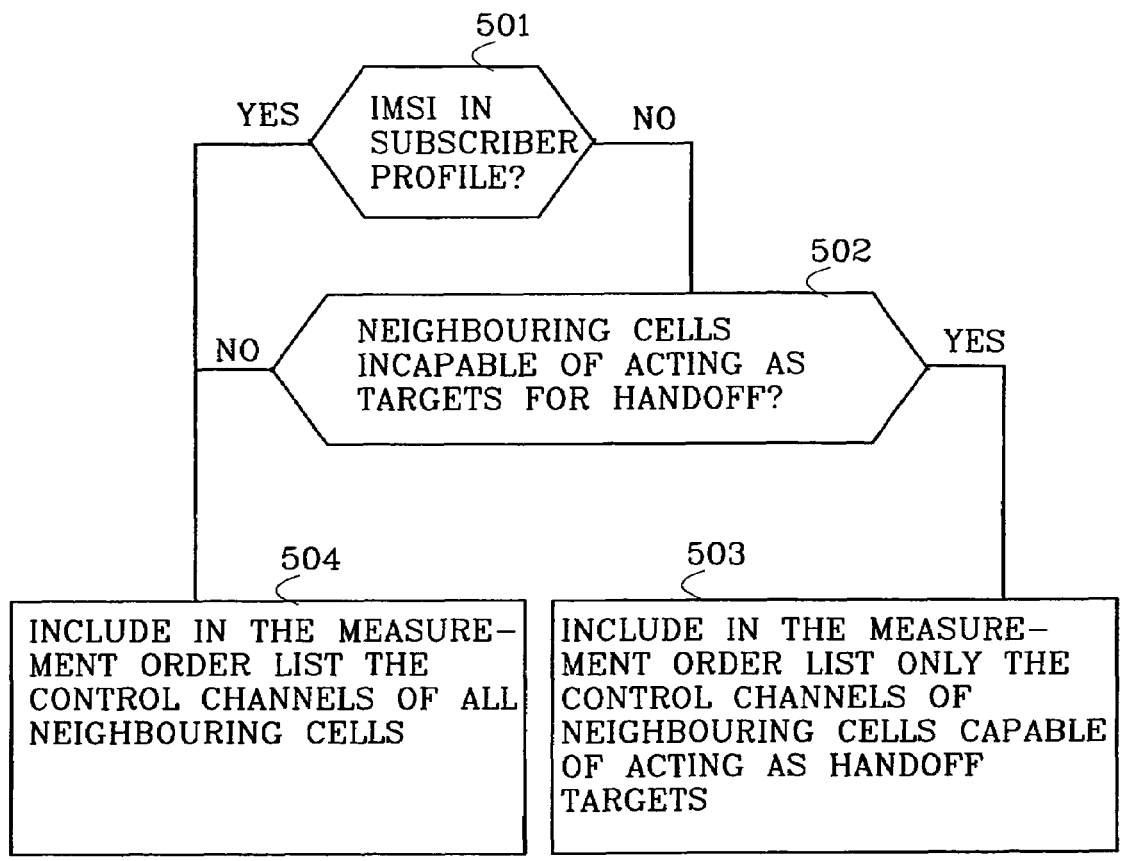
FIG. 5 is a flow diagram illustrating a first method according to the invention.

FIG. 5 illustrates an exemplary first embodiment of a method according to the invention for preparing a measurement order list for transmission to a mobile station, e.g. the first mobile station MS1, as it enters a busy state, i.e. becomes engaged in a call using a dedicated traffic channel DTC1 in a serving cell, e.g. the first cell C1, belonging to the service area of the first mobile switching center MSC1. The method is performed in the mobile switching center MSC1 by the control unit 201.

At step 501, the control unit 201 examines the subscriber profile copy associated with the mobile station stored in the memory 201 to determine whether the subscriber profile contains an IMSI-identity, i.e. to determine whether the subscriber profile contains identity information ensuring unique identification of the mobile station in the second cellular network 102.

If the subscriber profile contains no IMSI identity (an alternative NO at step 501), the control unit 201 checks at step 502 whether there are any cells among the neighbouring cells of the serving cell which are incapable of acting as targets for handoff. In the exemplary first embodiment of the invention, neighbouring cells in the second cellular network 102 are incapable of acting as targets for handoff of a mobile station lacking an IMSI-identity.

The control unit 201 examines the neighbouring cell list field 302 of the cell record 301 associated with the serving cell to determine which neighbouring cell records 303 represent neighbouring cells of the serving cell. The control unit 201 examines the control domain field 305 of each neighbouring cell record 303 representing the neighbouring cells to determine whether the set of neighbouring cells includes any cells belonging to the second cellular network 102. If the set of neighbouring cells includes cells belonging to the second cellular network 102, the control unit 201 continues processing at step 503 where it prepares a measurement order list containing only control channels associated with neighbouring cells belonging to the first cellular network 101. In other words, when preparing the measurement order list, the control unit 201 omits all control channels associated with neighbouring cells which belong to the second cellular network 102, thereby being incapable of acting as targets for handoff of a mobile station lacking an IMSI identity.

If either the mobile station is associated with a subscriber profile containing an IMSI-identity (an alternative YES at step 501) or the set of neighbouring cells includes no cell in the second network 102 (an alternative NO at step 502), all neighbouring cells are capable of acting as targets for handoff and hence the control unit 201 includes the control channels of all neighbouring cells when preparing a measurement order list at step 504.

When the above described method is used for preparing a measurement order list for transmission to the first mobile station MS1 while it is operating in the first cell C1, the control unit 201 determines, at step 501, that the subscriber profile associated with the first mobile station MS1 contains no IMSI and, at step 502, that the set of neighbouring cells C2–C7 includes cells C5–C7 which are incapable of acting as target cells for handoff. Hence, the control unit 201 omits all control channels CC5–CC7 associated with the cells C5–C7 when preparing the measurement order list for transmission to the first mobile station MS1, i.e. the measurement order list contains only the control channels CC1–CC4.

After preparing the measurement order list, the first mobile switching center MSC1 orders the base station BS1 serving the first cell C1 to transmit the measurement order list in a TIA/EIA IS-136 Measurement Order message MO1 on the digital traffic channel DTC1 to the first mobile station MS1. The first mobile station MS1 performs measurements in accordance with the measurement order list and reports measurement results by transmitting TIA/EIA IS-136 Channel Quality messages CQ1 on the digital traffic channel DTC1 to the base station BS1 serving the first cell C1.

Apart from the exemplary embodiments of the invention disclosed above, there are several ways of providing rearrangements, modifications and substitutions of the first embodiment resulting in additional embodiments of the invention.

By shortening a measurement order list, as disclosed above, the quality of signal measurements reported by a mobile station is increased, since the mobile station is able to spend more time measuring each radio channel included in the measurement order list. Instead of shortening the measurement order list, the control channels of neighbouring cells incapable of acting as targets for handoff may be replaced by radio channels which needs to be measured for other purposes than finding handoff candidates, i.e. the capacity for performing non-handoff related radio signal measurements can be increased. Also, even if only a single control channel associated with a neighbouring cell, which is incapable of acting as a target for handoff, is omitted from the measurement order list, an increased quality of reported measurement results or capacity for non-handoff related radio signal measurement is achieved.

In the embodiments of the invention disclosed above, neighbouring cells C5–C7 in the second cellular network 102 are incapable of acting as handoff targets for handoff of a mobile station lacking an IMSI-identity. There are several other situations where some cells defined as neighbouring cells to a serving cell may be incapable of acting as handoff targets.

One example of such situations, is where a mobile station is used by a subscriber of a fixed subscription area (FSA) service similar to the service disclosed e.g. in WO 96/34500. According to the present invention, cells outside the FSA subscribed to would be considered as cells incapable of acting as targets for handoff of the subscribers mobile station.

Another example of such situations is where a subscriber is requesting a particular communication service and not all neighbouring cells support this communication service. This situation may e.g. arise in connection with a call having a service code of "G3 facsimile" or "Digital Speech Only" and some of the neighbouring cells only support analog Voice Channels.

The examples above are but a few examples of how a neighbouring cell is found to be incapable of acting as a target for handoff of a mobile station by comparing the characteristics of the cell, e.g. whether the cell is in the same cellular network as the serving cell or whether the cell supports the service requested, with required characteristics of potential handoff target cells derived from a subscriber profile associated with the mobile station or a requested communication service.

As a person skilled in the art appreciates, application of the invention is in no way limited to only terrestrial cellular radio communication networks conforming to the EIA/TIA IS-136 specifications. Thus, as long as the cellular network applies some kind of MAHO-feature wherein the cellular network provides mobile stations with information specifying which radio channels are to be measured, the invention is applicable. Hence, the invention is also applicable in cellular networks adhering to e.g. the GSM- or PDC specifications.

What is claimed is:

1. A method in a first cellular radio communication network for preparing a measurement order list for transmission to a mobile station operating in a first cell of the first cellular radio communication network, the method comprising the steps of;
   a) determining whether at least one cell, in a set of cells defined as neighbouring cells to the first cell is incapable of acting as a target for handoff of said mobile station, wherein said set of cells defined as neighboring cells can include cells within a second cellular radio communication network in which the mobile station is allowed to operate, wherein said step of determining comprises the step of comparing characteristics of the cell with required characteristics derived from a subscriber profile stored in a Home Location Register associated with the mobile station, wherein if a neighboring cell is associated with a second cellular radio communication network in which the mobile station is not allowed to operate, the neighboring cell is automatically determined to be incapable of acting as a target for handoff;
   b) generating the measurement order list by including in the measurement order list control channels associated with cells in the set of neighbouring cells while, if at least one cell incapable of acting as a target for handoff was found at step a), omitting at least one control channel associated with such a cell from the measurement order list.

2. A method according to claim 1, wherein step b) involves omitting from the measurement order list all control channels associated with cells in the set of neighbouring cells which are incapable of acting as target cells for handoff.

3. A method according to claim 1, wherein it is determined that the mobile station is not allowed to operate in the second cellular communication network if the subscriber profile contains no identity information ensuring unique identification of the mobile station in the second cellular radio communication network.

4. A control node for use in a first cellular radio communication network, the control node comprising:
   a memory for storing configuration data defining a set of neighbouring cells to a first cell in the first cellular radio communication network, wherein said set of cells defined as neighboring cells can include cells within a second cellular radio communication network in which the mobile station is allowed to operate, said data including control channels associated with each neighbouring cell;
   a control unit adapted to generate a measurement order list for transmission to a mobile station operating in the first cell, the control unit further being adapted to generate the measurement order list by including in the measurement order list control channels associated with said neighbouring cells, characterized in that the control unit is further adapted to determine whether at least one cell in the set of neighbouring cells is incapable of acting as a target for handoff and, if such an incapable cell is found, omit from the measurement order list at least one control channel associated with a cell found being incapable of acting as a target for handoff, wherein the determination of whether a cell in the set of neighbouring cells is incapable of acting as a target for handoff comprises comparing characteristics of the cell with required characteristics derived from a subscriber profile stored in a Home Location Register associated with the mobile station, wherein the control unit is adapted to determine if a neighboring cell is associated with a second cellular radio communication network in which the mobile station is not allowed to operate and, if so, the neighboring cell is automatically determined to be incapable of acting as a target for handoff.

5. A control node according to claim 4, wherein the control unit is adapted to omit from the measurement order list all control channels associated with cells which are incapable of acting as targets for handoff.

6. A control node according to claim 4, wherein the control unit is adapted to determine that the mobile station is not allowed to operate in the second cellular radio communication network if the subscriber profile contains no identity information ensuring unique identification of the mobile station in the second cellular radio communication network.

7. A control node according to claim 4, wherein the control node is a mobile switching center.

8. A cellular radio communication network comprising at least one control node according to claim 4.

* * * * *